No. 697,738. Patented Apr. 15, 1902.
H. R. MILLER.
PHOTOGRAPHIC INSTRUMENT.
(Application filed May 4, 1901.)
(No Model.) 2 Sheets—Sheet 1.
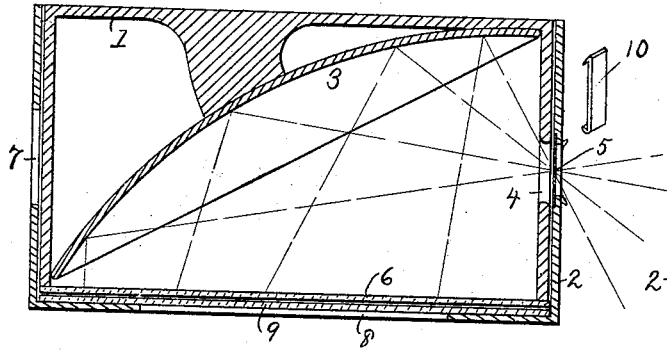
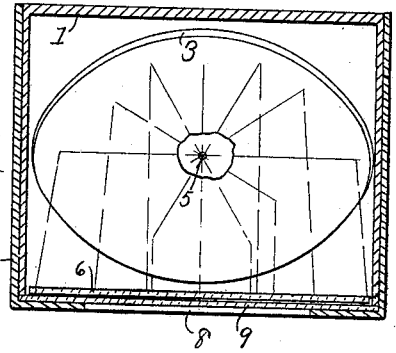
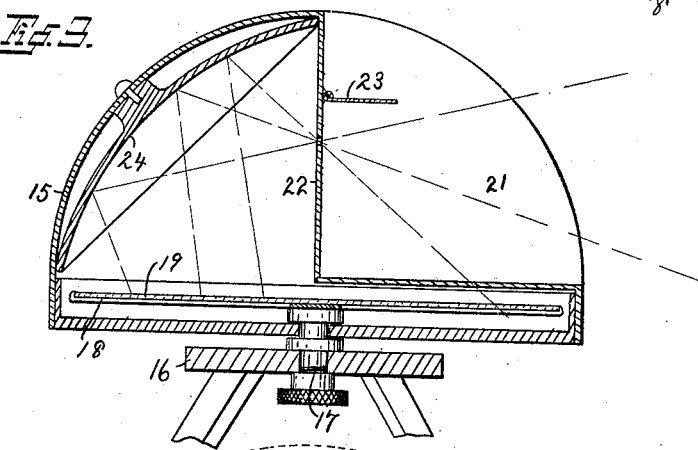
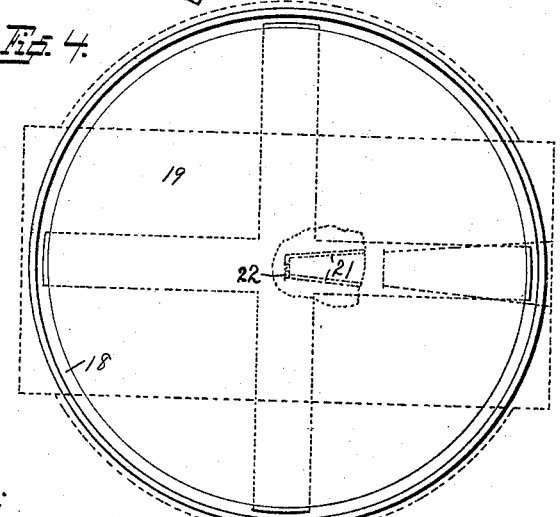
Witnesses:
F. A. Otto
E. L. Roesch.
Inventor
Herman R. Miller
By Erwin F. Wheeler
Attorneys.

No. 697,738. Patented Apr. 15, 1902.
H. R. MILLER.
PHOTOGRAPHIC INSTRUMENT.
(Application filed May 4, 1901.)
(No Model.) 2 Sheets—Sheet 2.
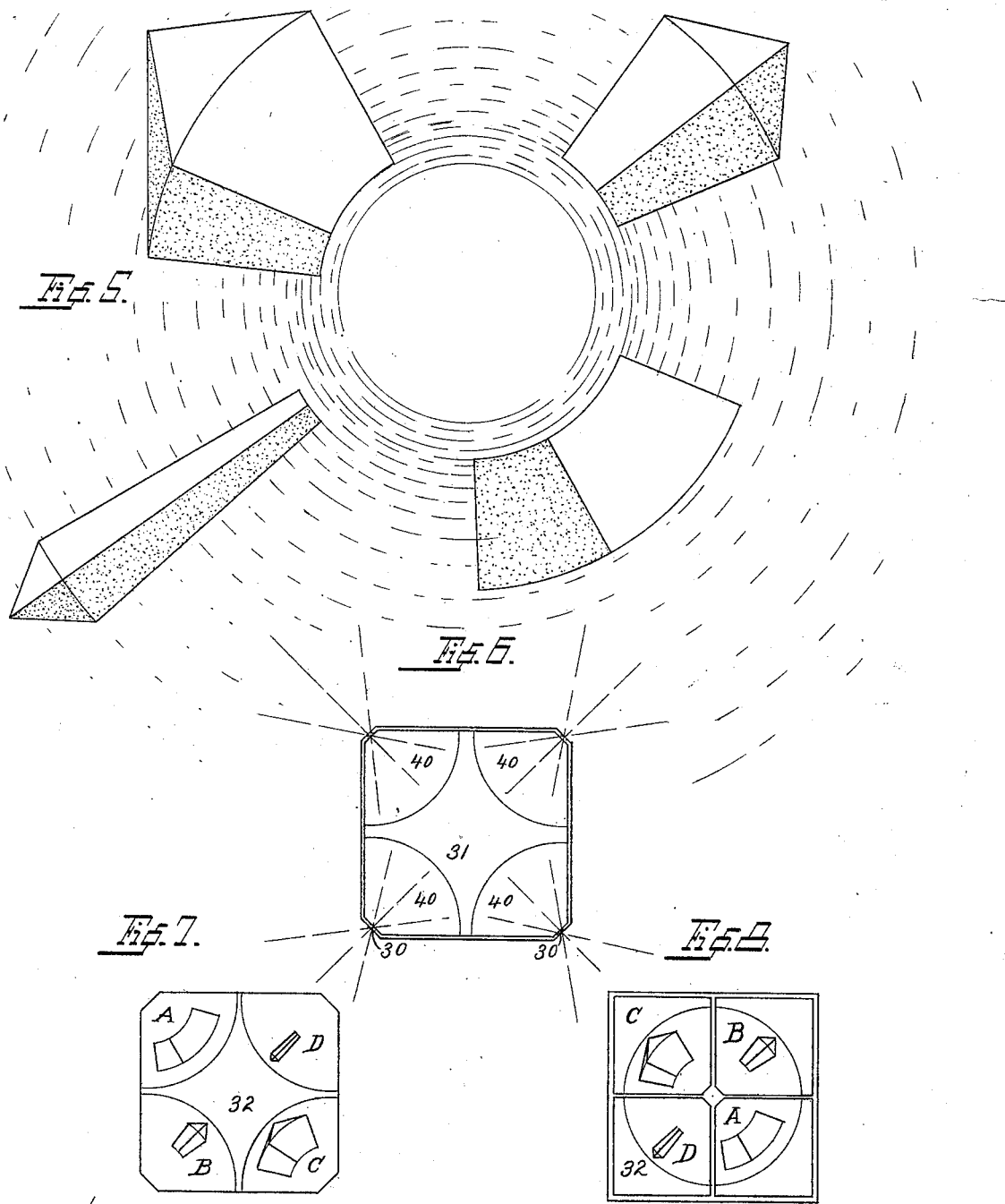

UNITED STATES PATENT OFFICE.

HERMAN R. MILLER, OF MILWAUKEE, WISCONSIN.

PHOTOGRAPHIC INSTRUMENT.

SPECIFICATION forming part of Letters Patent No. 697,738, dated April 15, 1902.

Application filed May 4, 1901. Serial No. 58,703. (No model.)

*To all whom it may concern:*

Be it known that I, HERMAN R. MILLER, a citizen of the United States, residing at Milwaukee, county of Milwaukee, and State of Wisconsin, have invented new and useful Improvements in Photographic Instruments, of which the following is a specification.

My invention relates to improvements in photographic instruments.

The object of my invention is to provide means whereby a complete and accurate but distorted image of the entire horizon or any desired portion thereof may be depicted upon a flat sensitive plate without the use of lenses, but through the medium of a concave mirror of a focal length equal to the dimensions of the case, which may be of any desired dimensions, all vertical lines of the scene photographed being resolved into radial lines and all horizontal lines into concentric circles in the photographic image, said image or photograph being capable of reproducing an exact and perfect picture of the original scene when viewed through the medium of the same or a similar mirror or when the image is thrown by such a mirror from the plate to a suitable screen.

In the following description reference is had to the accompanying drawings, in which—

Figure 1 is a vertical sectional view of a device embodying my invention drawn through the eye or light-admitting aperture of the camera and the center of the mirror. Fig. 2 is a vertical transverse sectional view of the same. Fig. 3 is a sectional view of a device embodying my invention formed to rotate upon a central pivot, whereby all portions of the landscape may be successively exposed. Fig. 4 is a top view of the same. Fig. 5 is a view of the distorted image of an entire landscape and horizon obtained by means of the device shown in Figs. 3 and 4. Fig. 6 is a diagrammatic plan of a modified form of construction in which the entire horizon may be simultaneously photographed in separate images each of which occupies an arc of ninety degrees, the images being subsequently separated and reunited to form a complete circular picture of the entire landscape. Figs. 7 and 8 are views of the sensitive plate used with the device shown in Fig. 6 as it appears, respectively, before and after separation and readjustment.

Like parts are identified by the same reference characters throughout the several views.

My invention in its simplest form consists, merely, in an inclosing case provided with an eye or small aperture for the admission of light adapted to substantially exclude the parallel rays from the interior, a concave mirror or speculum diagonally disposed across the horizontal plane of the eye, and a support for a sensitized plate substantially in the focal plane of the mirror.

In Figs. 1 and 2 I have illustrated a form of construction in which the inclosing case consists of two interacting or telescoping parts 1 and 2, respectively, the speculum 3 being located in a diagonal position in the part 1 and extending from the angle of the top and front walls to the lower portion of the rear wall. The front wall of this part is provided with a slot or aperture 4. The part 2 of the casing is of slightly-larger diameter than the part 1, so as to inclose the side walls of the part 1, and is provided with a small aperture 5, which when the parts are in position for use registers with the larger aperture 4 in the part 1 and constitutes the eye or light-aperture of the camera. The sensitized plate 6 is placed on the bottom of the case, which is of such dimensions that the plate will occupy a position substantially in the focal plane of the mirror—*i. e.*, the plate is sufficiently near to the focal plane of the mirror to receive a clearly-defined image. The aperture 5 is covered by any suitable cap 10, which when removed permits the light to enter the camera, when it is reflected by the mirror to the sensitive plate 6. The cap 10 is shown detached in connection with Fig. 1. The part 2 of the inclosing case is provided with an aperture 7 in its rear wall which corresponds in size with the aperture 4 in the front wall of the part 1. The bottom of the part 2 is provided with a large aperture 8, closed by a translucent glass plate 9. This is kept covered when the negative is being taken; but when it is desired to iew the picture this aperture is uncovered and the part 2 removed from the part 1 and turned so that the rear wall is brought to the front, when it is again readjusted to the part 1, thus rendering the apertures 7 and 4 coincident. Since the rays will not be crossed in passing through the apertures 7 and 4, the entire apparatus is then turned bottom side up, when the picture may be viewed through these apertures, an exact reproduction of the original scene being thus secured.

Referring to the embodiment of my invention shown in Figs. 3 and 4, it will be observed that I have shown a semicylindrical casing 15, mounted to rotate upon a platform 16. A central pivot-bolt 17 projects upwardly from the platform 16 and not only furnishes a bearing for the casing, but also supports a stationary holder 18 for the sensitive plate 19. A segmental opening is made in the curved surface of the casing, and inwardly-extending walls 21 form a V-shaped recess which terminates on the vertical line of the pivotal axis of the casing, with an eye or light-aperture 22 in the end wall of the recess. 23 is a shutter for covering the aperture 22, and 24 is the speculum. It will be observed that the plate 19 is circular in form and covers substantially the entire bottom surface of the casing. When the plate is in position and the light-aperture is opened, the casing may be slowly turned upon its pivotal axis to expose the light-aperture to all points of the compass, the entire horizon being thereby reflected on the plate. If desired, the casing may be made to perform two or three revolutions, as the same rays of light from the several objects will reach the same points on the plate whenever permitted to enter said aperture. A complete photograph of the entire landscape is thus obtained, except that portion which is shut out by the base of the casing, the style of photograph thus obtained being illustrated in Fig. 5.

In Fig. 6 I have shown a diagram of an apparatus similar to that shown in Fig. 1, except that light-apertures 30 are provided at the four corners of an inclosing case 31, with four speculums 40 for separately receiving the rays and reflecting them to a single plate 32. As each speculum is capable of receiving light-rays from an arc of ninety degrees, the four taken together will simultaneously produce upon the plate an image of one-quarter of the landscape, but with the horizon-line at the inner boundary of the image, as shown in Fig. 7. The plate is then divided and the parts transposed and reunited, as shown in Fig. 8, the parts A and C being exchanged in position without turning and the parts B and D being similarly shifted, thus producing a single circular picture similar to that obtained by the device shown in Fig. 3, but without the large blank central space. This instrument is especially adapted for photographing moving objects, as the entire view is simultaneously taken.

Having thus described my invention, what I claim as new, and desire to secure by Letters Patent, is—

1. In a device of the described class, the combination of an inclosing case, provided with a light-aperture, adapted to substantially exclude the parallel rays from the interior; a speculum located within the case, and diagonally disposed across the horizontal plane of the light-aperture; and means for supporting a sensitized plate within the case in substantially the focal plane of the speculum, but at an angle to the speculum, whereby the rays reflected from the speculum are distorted on the plate.

2. In a device of the described class, the combination of an inclosing case provided with a light-aperture; a speculum located in said case in a position to receive the rays of light coming through said aperture; and means for supporting a sensitized plate approximately in the focal plane of the speculum, but at an angle thereto, said light-aperture being of such relatively small dimensions as to exclude substantially all the parallel rays from the speculum.

3. In a device of the described class, the combination of a rotary casing, having a recess in one side, and having a light-admitting aperture formed to exclude parallel rays, located in the recess, on the axial line of rotation; a speculum mounted in the casing and adapted to receive the light from said aperture; and means for supporting a stationary sensitized plate within the casing in such a position, and of such dimensions, as to substantially coincide with, the focal planes of the speculum and receive the light-rays therefrom at all points of casing adjustment.

4. In a device of the described class, the combination of a rotary casing; a speculum located therein at one side of the axis of rotation; said casing having a light-admitting aperture located on the axis of casing rotation, and formed to substantially exclude parallel rays; and means for supporting a stationary sensitized plate within the casing, substantially in one or more focal planes of the speculum, when the casing is at different points of adjustment.

5. In a device of the described class, the combination of a rotary casing provided with a recess having vertical opaque walls, and having a light-admitting aperture located on the axis of casing rotation; a speculum located within the casing at one side of the axis of rotation, and arranged to receive rays of light from the aperture; and means for supporting a stationary sensitized plate within the casing, in substantially the focal plane of the speculum at one or more points of casing adjustment.

6. In a device of the described class, the combination of an inclosing casing provided with one or more light-admitting apertures, formed to exclude parallel rays from the interior; a speculum adapted to receive light from each such aperture; and means for supporting a sensitized plate, substantially in the focal plane of the speculum.

In testimony whereof I affix my signature in the presence of two witnesses.

HERMAN R. MILLER.

Witnesses:
    JAS. B. ERWIN,
    LEVERETT C. WHEELER.